US007377455B1

(12) United States Patent
Fyfe

(10) Patent No.: US 7,377,455 B1
(45) Date of Patent: May 27, 2008

(54) PORTABLE SPRAYER

(76) Inventor: Scott A. Fyfe, P.O. Box 3478, San Dimas, CA (US) 91773

( * ) Notice: Subject to any disclaimer, the term of this patent is extended or adjusted under 35 U.S.C. 154(b) by 217 days.

(21) Appl. No.: 11/126,815

(22) Filed: May 11, 2005

Related U.S. Application Data

(63) Continuation-in-part of application No. 10/632,023, filed on Jul. 31, 2003, now abandoned.

(51) Int. Cl.
*B05B 9/04* (2006.01)
*B05B 11/06* (2006.01)
*B65D 83/00* (2006.01)
*F16K 1/00* (2006.01)
*F16K 15/00* (2006.01)

(52) U.S. Cl. ...................... 239/373; 239/355; 222/401; 222/400.8; 251/319; 251/321

(58) Field of Classification Search ................ 239/373, 239/355, 302, 320, 321, 333, 337, 525, 569; 222/401, 400.8, 400.7; 251/319, 321, 318, 251/320, 323, 325
See application file for complete search history.

(56) References Cited

U.S. PATENT DOCUMENTS 689,107 A * 12/1901 Mitchell ..................... 239/355
2,049,194 A * 7/1936 Chapin et al. ........... 222/400.8
2,342,940 A * 2/1944 Janke ......................... 222/209
2,996,258 A * 8/1961 Commarato ................ 239/361
3,779,465 A * 12/1973 Jett et al. .................... 239/416
4,116,382 A * 9/1978 Clerk ............................ 239/8
4,204,645 A * 5/1980 Hopp ......................... 239/341
5,485,857 A * 1/1996 Amundsen ............... 134/102.2
6,155,497 A * 12/2000 Hudson et al. ............. 239/373

* cited by examiner

*Primary Examiner*—Darren Gorman
(74) *Attorney, Agent, or Firm*—Richard S. Erbe

(57) ABSTRACT

A portable sprayer comprising a generally cylindrically shaped tube and an air volume chamber, a piston rod inserted in the cylinder, a container for holding a material, a spray nozzle, and a delivery tube inserted in the container and extended to the spray nozzle is contained in a single unit. The spraying operation is activated by applying a pumping action to the piston rod. An air control valve mounted to the sprayer allows for the rapid bleed off of air from the unit. The preferred embodiment of the invention is of a size and weight so that it may easily carried.

3 Claims, 4 Drawing Sheets

PORTABLE SPRAYER

RELATED APPLICATIONS

This application is a continuation-in-part application of U.S. patent application Ser. No. 10/632,023 filed Jul. 31, 2003 now abandoned.

BACKGROUND OF THE INVETION

1. Field of the Invention

The present invention relates to material spraying devices and more particularly pertains to such a device that is hand-held, portable and easy to use.

2. General Background and State of the Art

The use of spraying devices a wide variety of projects is known in the prior art. Such sprayers may be used to spray liquids, chemicals, aggregate, or other compounds. It is recognized that there are generally three types of sprayers; 1) hand-held manually powered units; 2) air compressor powered units; and 3) motorized units which may have a mechanical mixing tank. The present invention is of the hand-held manually-powered type, sometimes referred to as a "bug sprayer." Some of the better-known devices that are of some relevance to the present invention will be described here.

U.S. Pat. No. 4,364,521 to Stankowitz discloses a portable, self-contained texture applicator having a pressure tank adapted to be charged from an external source or by a manually actuatable pump incorporated in the tank. Air pressure can only be released by the spraying operation. Stankowitz does not disclose the use of a portable hand-held, manually-powered, low pressure sprayer with an air control valve.

U.S. Pat. No. 4,204,645 to Hopp discloses a hand-held, compression-type sprayer. Air pressure can only be released by the spraying operation. Hopp does not disclose the use of a portable hand-held, low pressure sprayer with an air control valve.

U.S. Pat. No. 3,820,722 to Jett, et al., discloses a portable hand-held aggregate sprayer that is manually pressurized. The aggregate is sprayed most effectively after significant pressure is manually built up in the device by the user. Air pressure can only be released by the spraying operation. Jett, et al. does not disclose the use of a portable hand-held, low pressure sprayer with an air control valve.

U.S. Pat. No. 3,002,699 to Pinke discloses a manually-operated sprayer having an air pump and a receptacle attached to it that contains the material to be sprayed. Air pressure can only be released by the spraying operation. Pinke does not disclose the use of a portable, hand-held, low pressure sprayer with an air control valve.

None of the above patents, taken either singly or in combination, is seen to describe the present invention as disclosed and claimed.

While portable, hand-held, manually operated sprayers are known, there are several disadvantages to the known devices.

Prior art devices require the individual to provide substantial force and repeated pumping action to begin the spraying operation, and not all individuals are capable of providing or sustaining such force for any appreciable length of time.

The requirement inherent in prior art devices for the application of substantial force in the pumping action by an individual also leads to heating up and excessive wear on vital parts of the sprayer, such as the seals on the extremis of the piston rod.

In the prior art devices, as the level of the material being sprayed in the container is lowered during the spraying operation, the amount of applied operating force required is lessened, but the material consistency of the spray is substantially lessened and the sprayed material is generally wasted as the air is gradually forced out through the spray nozzle.

There is no portable sprayer that provides for operation with lower applied pressure, thus enabling longer operation and more effective operation, that also provides a control device that reduces wastage of the material being sprayed.

SUMMARY OF THE INVENTION

Accordingly, it is an object of the invention to provide a portable sprayer that can be operated with low applied pressure.

Another object of the invention is to provide a portable sprayer that allows the user to operate the sprayer for longer periods of time than do prior art devices.

A further object of the invention is to provide a portable sprayer that produces less wear on vital parts and reduces the need for replacement and repair.

An additional object of the invention is to provide a portable sprayer that reduces wastage of the sprayed material.

It is yet another object of the invention to provide a portable sprayer that is easily transportable.

Still another object of the invention is to provide a portable sprayer configured to allow for use of larger material containers because of the ease of spraying.

These and other objectives are achieved by the present invention, which, in a broad aspect, provides the user with a powerful, versatile portable spraying device that is easy to carry and use.

An apparatus according to the preferred embodiment of the present invention provides a portable sprayer comprising a cylinder in which is inserted a piston rod, a material container, a transition and a spray nozzle. A delivery tube is inserted in the container and conveys material to the nozzle when force is applied by operating the piston rod.

The sprayer includes an additional air volume chamber in fluid communication with the cylinder by means of an opening in the cylinder, which increases the effective air volume available in the application process. A one-way check valve allows air flow to the forward part of the cylinder, additional air volume chamber, and material container when the piston rod is pushed inward, and seals off the air when the piston rod is retracted.

In another embodiment of the invention, the additional air volume chamber is attached to the outside of the cylinder and is generally concentric in relation to the cylinder. An opening in the cylinder allows air flow between the cylinder and the additional air volume chamber.

Another feature of the present invention is an air control device mounted on the sprayer through an aperture in either the cylinder or the air chamber. In the preferred embodiment of the invention, the air control device takes the form of a manually-operated valve that the operator can use to quickly bleed off the air from the cylinder and the air chamber, thus rapidly reducing the flow of material from the sprayer nozzle. However, a rubber stopper or the finger or thumb of a hand could be used to perform this function.

Further objects and advantages of this invention will become more apparent from the following description of the preferred embodiments, which, taken in conjunction with the accompanying drawings, will illustrate, by way of example, the principles of the invention.

BRIEF DESCRIPTION OF THE DRAWINGS

The foregoing and other objects, aspects and advantages will be better understood from the following detailed description of the preferred embodiments of the invention with reference to the drawings in which.

DETAILED DESCRIPTION OF THE PREFERRED EMBODIMENTS OF THE INVENTION

In the following description of the present invention, reference is made to the accompanying drawings, which form a part thereof, and in which are shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

Figure 1:
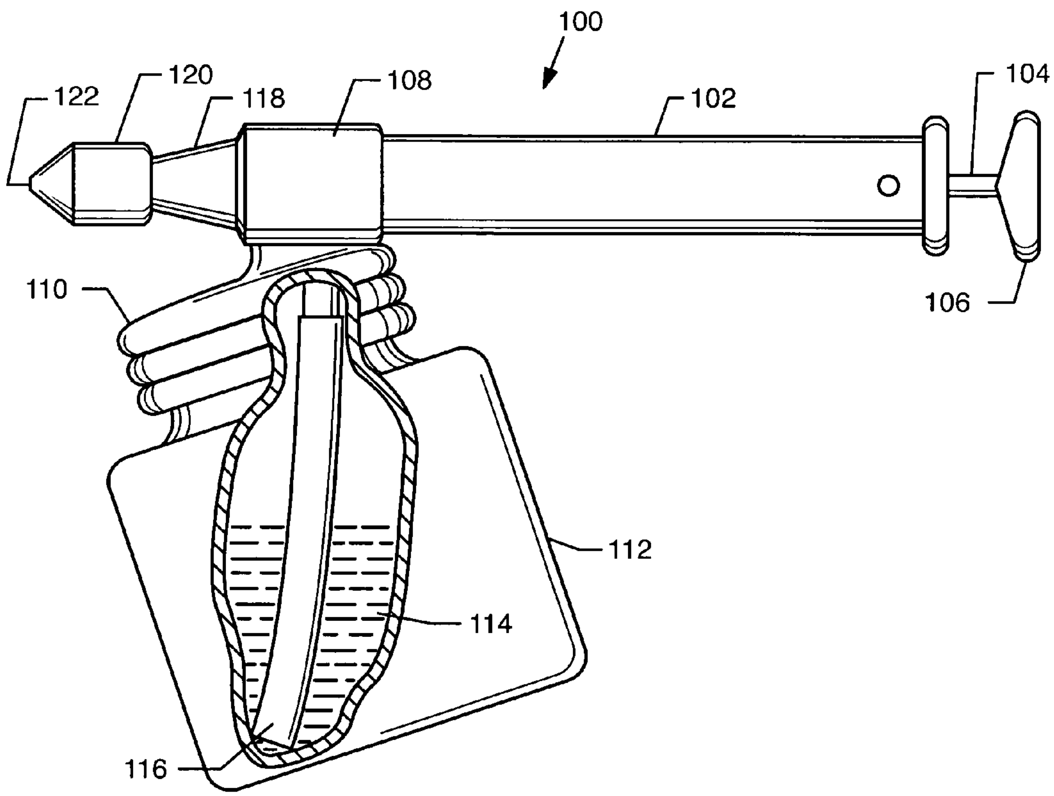
FIG. 1 PRIOR ART
FIG. 1 illustrates a side view of a prior art spraying device.

A portable, hand-held sprayer of the prior art, often referred to as a "bug sprayer," is illustrated in FIG. 1 and generally referred to by the reference numeral 100. The sprayer 100 includes means for providing air under pressure in the form of cylinder 102 incorporating a piston head connected to a piston rod 104 terminating in a handle 106 for manual pumping. The forward end of cylinder 102 includes an air chamber 108 communicating with an opening in a cap 110 rigidly secured to the lower wall of chamber 108.

A container 112 for a spraying material, in this case an aggregate spray composition 114, is threadably held by cap 110 as shown. The aggregate composition 114 is passed through the chamber 108 by a delivery tube 116. The forward end of air chamber 108 terminates in a nozzle support structure 118 holding a nozzle 120, which has an outlet orifice 122.

To operate sprayer 100, the operator grasps handle 106 and pulls the piston rod 104 outwards from the cylinder 102, drawing air into the cylinder. When the handle 106 reaches its furthest possible point from sprayer 100, the operator pushes handle 106 and piston rod 104 into cylinder 102. This action compresses the air in the cylinder 102, causing pressure on aggregate composition 114, which is then forced through delivery tube 116 to nozzle 120 and out of outlet orifice 122.

Repeated application of the heretofore described pumping action will cause the amount of aggregate composition 114 in container 112 to be lessened. The operator will notice a gradual reduction in the amount of pumping force he or she must apply to sprayer 100 as the aggregate composition 114 supply is lessened, but will also notice that the spraying distance and amount of composition sprayed will decrease rapidly, resulting in wastage of the aggregate composition. Thus, frequent refilling of container 112 with aggregate composition must be done in order to continually produce an effective application of aggregate composition 114 on a work surface.

The operator of sprayer 100 will also notice that there is no effective way to shut off the spray stream during operation to reduce the wastage of aggregate composition 114.

Figure 2:
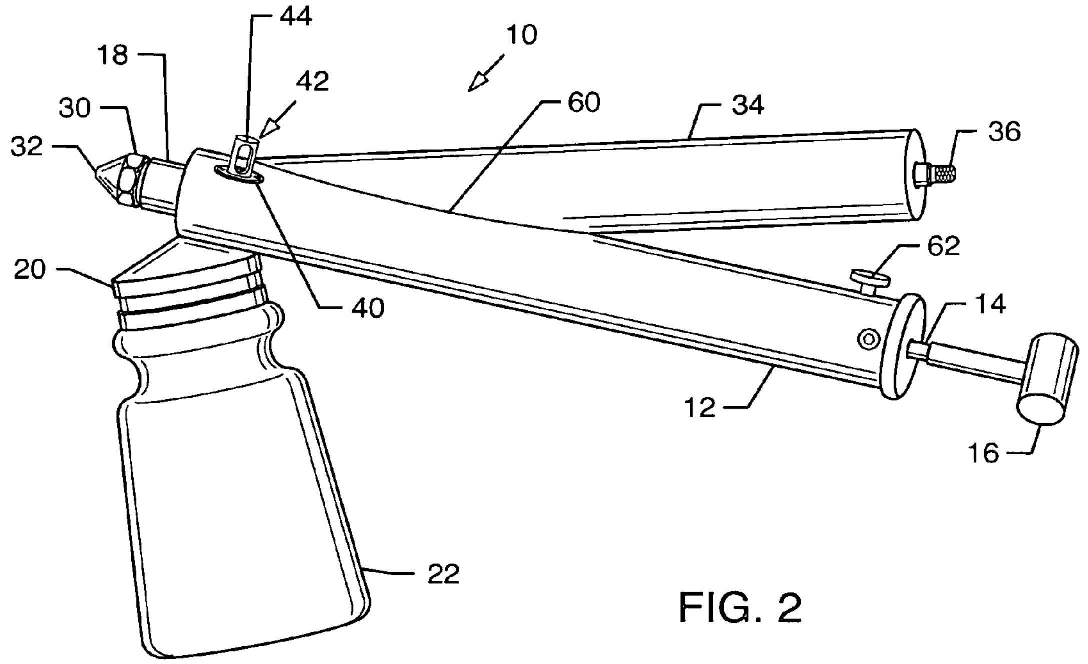
FIG. 2 illustrates a perspective view of an exemplary apparatus according to the present invention.
Figure 3:
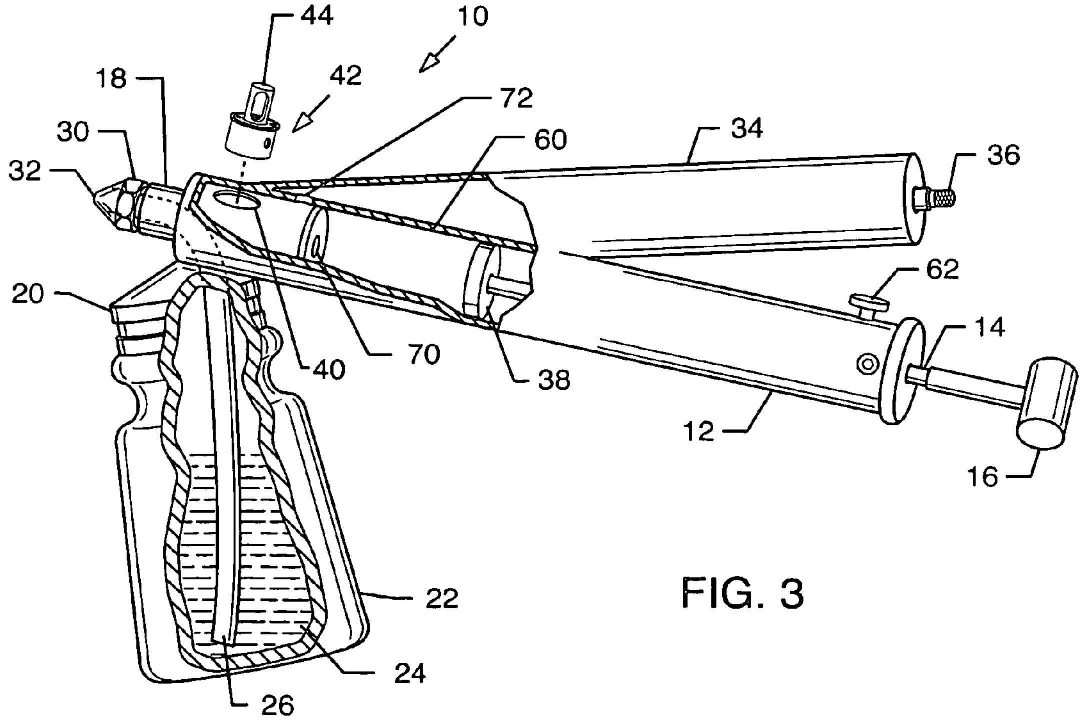
FIG. 3 illustrates a partial cutaway side view of an exemplary apparatus according to the present invention.

A portable sprayer in accordance with the present invention is illustrate in FIGS. 2 and 3 and is embodied in an assembly generally referred to by the reference numeral 10. Those skilled in the art will notice that the sprayer 10 has several similarities to prior art sprayer 100. Sprayer 10 is comprised generally of cylinder 12, in which is inserted a piston rod 14, which is operated by handle 16. The end opposite of handle 16 on piston rod 14 terminates in cup seal 38, as illustrated in FIG. 3. Those skilled in the art will recognize that there are alternative structures to cup seal 38 that can be utilized in the present invention, for example, an O-ring seal. The forward end of cylinder 12 includes transition 18 communicating with cap 20 secured to the lower wall of transition 18.

A container 22 for spray composition 24 is threadably held to cap 20 as shown. When pressure is applied to sprayer 10 by means of a pumping action on piston rod 14, the air in sprayer 10 is compressed, forcing spray composition 24 through delivery tube 26 to nozzle 30 and out of orifice 32. A one-way flapper or check valve 70 located inside of cylinder 12 allows for air to be forced into the forward part of cylinder 12, container 22, and delivery tube 26 when piston rod 14 is pushed inward while sealing off these areas so that air does not leak from them when piston rod 14 is pulled outward. A check valve manufactured by H.D. Hudson Company of Chicago, Ill., has been found to be suitable for use with the present invention.

The sprayer of the present invention incorporates a number of features that enhance the performance of the present invention over prior art sprayers. Air volume chamber 34, shown in FIGS. 2 and 3, is attached to and in fluid communication with cylinder 12 at junction 60. In the preferred embodiment of the present invention, air volume chamber 34 is welded to cylinder 12 where it joins cylinder 12 at junction 60. An opening 72 allows for air to move between cylinder 12 and air volume chamber 34. The addition of air volume chamber 34 allows sprayer 10 to force a greater volume of air onto spray composition 24, but at a lower pressure than in prior art sprayers of the bug sprayer type. The user then does not have to apply as much force to handle 16 while performing the pumping action, thus making operation of sprayer 10 much easier than earlier devices.

Opening 72 in cylinder 12 allows air flow between cylinder 12 and air volume chamber 34. Opening 72 must be located in front of check valve 70; in other words, it must be located on the side of check valve 70 opposite from piston rod 14, which is located behind check valve 70.

Also, it has been found that the present invention allows for a more consistent spray pattern, both in length and breadth of spray, than do the prior art sprayers, because of the addition of air volume chamber 34. Additional air may be supplied through outside air hookup 36. In the preferred embodiment of the present invention, the air volume chamber 34 is in the shape of a cylinder. Those skilled in the art will recognize that the air volume chamber 34 may take on other configurations, such as a sphere. Furthermore, changing the configuration of cylinder 12 for at least part of its length, such as by enlarging its diameter, is another way to attain the advantages provided by the addition of increased air for spraying. Thumb screw 62 is used to provide a means to hold piston rod 14 in position when transporting or carrying sprayer 10 from one location to another.

Figure 4:
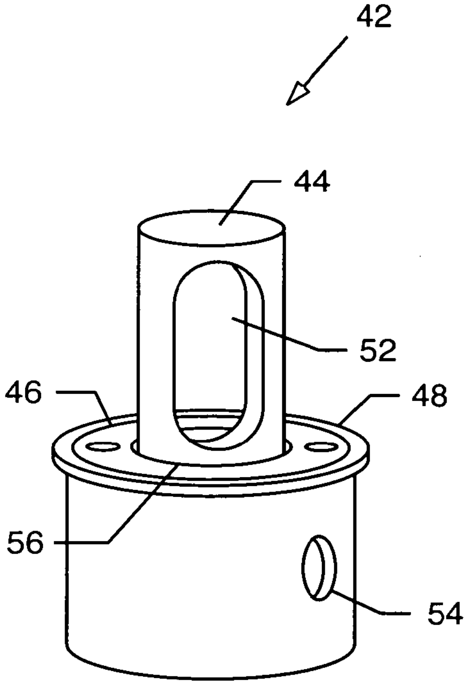
FIG. 4 illustrates a perspective view of the air control device with the spring fully extended for use with an exemplary apparatus according to the present invention.
Figure 5:
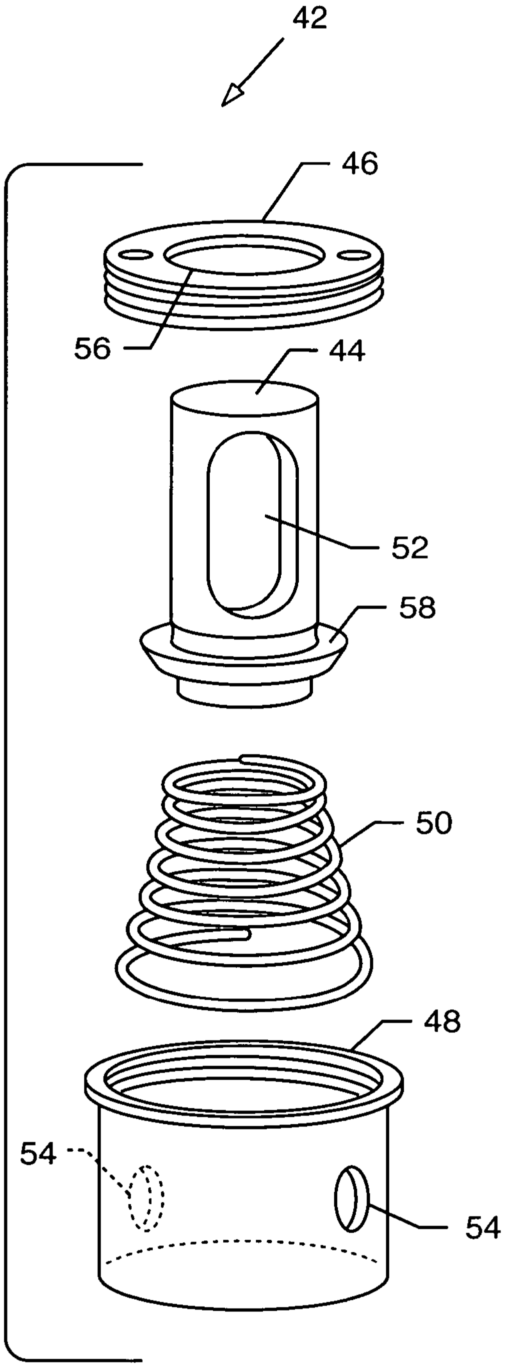
FIG. 5 illustrates an exploded view of the air control device for use with an exemplary apparatus according to the present invention.

Another important improvement provided by the present invention is the addition of air control valve 42. Air passage hole 40 in cylinder 12 allows air control valve 42 to be mounted to sprayer 10. Air control valve 42, as illustrated in FIGS. 4 and 5, is generally comprised of body 48, in which is inserted spring 50. Widened portion 58 of button 44 is pressed against spring 50 and opening 56 in locking cap 46 fits over button 44. Locking cap 46 is secured to body 48, holding button 44 in position by resting against widened portion 58. Those skilled in the art will recognize that there are a number of other configurations of devices, both manual and automatic, that could be used to control the flow of air from the sprayer without departing from the spirit of the present invention. For example, one could use a rubber stopper or even a finger or thumb of a hand to perform this function.

In normal operation, bleed air port 52 in button 44 is sealed from the air contained in cylinder 12 and air volume chamber 34. If, during spraying operations, the user wishes to halt the flow of spray composition 24 flowing out of sprayer 10, he or she simply depresses button 44 towards cylinder 12, exposing bleed air port 52 to air flow in cylinder 12 and air volume chamber 34 through air passageways 54 in valve body 48. This action allows the remaining air in cylinder 12 and air volume chamber 34 to be rapidly removed from sprayer 10, thus halting the flow of spray composition 24. The ability to quickly stop the flow of spray composition 24 at any point during the operation allows the user to make more efficient use of the spray composition by reducing wastage.

Another desirable feature of the improved sprayer 10 is that because less pumping force needs to be applied to handle 16 to start the spray of composition, a larger container of spray composition 24 may be used than with prior art sprayers, thus reducing the amount of "down time" to remove and refill the container.

Also, because less pressure is applied to cup seal 38 during operations with sprayer 10, less heat is built up and thus cup seal 38 will not wear out as quickly as similar sealing devices in prior art sprayers.

Figure 6:
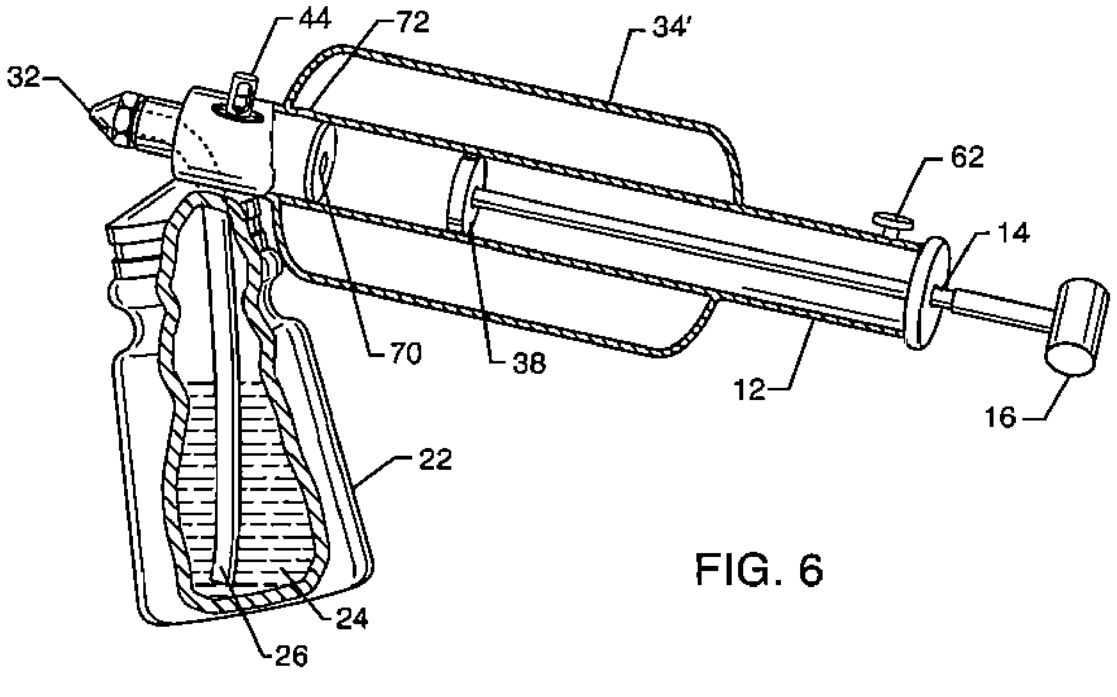
FIG. 6 illustrates a partial cutaway side view of an alternative embodiment of an exemplary embodiment according to the present invention.

FIG. 6 illustrates an alternative embodiment of a sprayer according to the present invention. In this embodiment of the invention, air volume chamber 34' is mounted on the outside of cylinder 12 and is generally concentric with cylinder 12 and provides space for additional air for use in spraying operation. Opening 72 in cylinder 12 allows for air to flow between cylinder 12 and air volume chamber 34'. Opening 72 must be located in front of check valve 70; in other words, it must be located on the side of check valve 70 opposite from piston rod 14, which is located behind check valve 70.

A sprayer of the present invention may be used in a wide variety of applications, such as spraying liquids on plants, applying chemicals, or texturizing building surfaces through the use of aggregate, for example.

The foregoing description of exemplary embodiments of the present invention have been presented for purposes of enablement, illustration, and description. They are not intended to be exhaustive of or to limit the present invention to the precise form discussed. There are, however, other configurations for spraying devices not specifically described herein, but with which the present invention is applicable. The present invention should therefore not be seen as limited to the particular embodiments described herein; rather, it should be understood that the present invention has wide applicability with respect to spraying devices for a wide variety of applications using various kinds of spray materials. Such other configurations can be achieved by those skilled in the art in view of the description herein. Accordingly, the scope of the invention is defined by the following claims.

What is claimed is:

1. An apparatus for spraying a material, comprising:

a container holding said material;

a sprayer configured to direct said material onto a surface, wherein said sprayer comprises:

a generally cylindrically shaped tube having opposed first and second ends;

a piston rod inserted into said first end of said tube, said piston having opposed first and second terminuses, said first terminus being exterior to said tube, said second terminus located within said tube;

a handle on said first terminus;

a seal on said second terminus;

a transition connected to said second end of said tube, through which passes said delivery tube;

a nozzle connected to said transition, through which passes said delivery tube; and an orifice in one end of said nozzle through which passes said material;

a delivery tube connected between said container and said sprayer such that there is material communication between said sprayer and said container;

an air control means attached to the sprayer to release air from within the sprayer;

a generally cylindrically shaped air volume chamber connected to said sprayer;

an opening in said sprayer to allow for the passage of air between said sprayer and said air volume chamber.

2. The apparatus according to claim 1, wherein said air control means comprises:

a generally cylindrically shaped body having a top and bottom;

a spring mounted within said body at said bottom;

an elongated, generally cylindrically shaped insert fitted within said body and abutting and compressing said spring, said insert having a widened portion where said insert abuts said spring; and a valve cap mounted on said top of said valve body and having a central opening sized to slide over said insert.

3. An apparatus for spraying a material, comprising:

a container holding said material;

a sprayer configured to direct said material onto a surface, wherein said sprayer comprises:

a generally cylindrically shaped tube having opposing first and second ends;

a piston rod inserted into said first end of said tube, said piston having opposed first and second terminuses, said first terminus being exterior to said tube, said second terminus located within said tube;

a handle on said first terminus;

a seal on said second terminus;

a transition connected to said second end of said tube, through which passes said delivery tube;

a nozzle connected to said transition, through which passes said delivery tube; and an orifice at one end of said nozzle through which passes said material;

a delivery tube connected between said container and said sprayer such that there is material communication between said sprayer and said container;

a generally cylindrically shaped air volume chamber connected to and in fluid communication with said sprayer; and an attachment for outside air.

* * * * *